(12) United States Patent
Naftaly et al.

(10) Patent No.: US 6,654,395 B1
(45) Date of Patent: Nov. 25, 2003

(54) 589 NM LASER

(75) Inventors: Mira Naftaly, Leeds (GB); Caroline A. Batchelor, Leeds (GB); Animesh Jha, Leeds (GB)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/943,287

(22) Filed: Aug. 30, 2001

Related U.S. Application Data (60) Provisional application No. 60/229,997, filed on Sep. 5, 2000.

(51) Int. Cl.[7] ............................................. H01S 3/14
(52) U.S. Cl. ............................. 372/39; 372/39; 372/40; 372/89
(58) Field of Search ................................. 372/39, 89, 40

(56) References Cited

U.S. PATENT DOCUMENTS

| | | | | |
|---|---|---|---|---|
| 5,313,547 A | * | 5/1994 | Lambard et al. | 385/142 |
| 5,973,824 A | * | 10/1999 | Sanghera et al. | 359/356 |
| 6,037,285 A | * | 3/2000 | Jha et al. | 501/37 |
| 6,304,711 B1 | * | 10/2001 | Samson et al. | 385/142 |
| 6,347,177 B1 | * | 2/2002 | Heo et al. | 385/142 |

OTHER PUBLICATIONS

Naftaly M., Batchelo C. and Jha A.; "Pr 3+ doped fluoride glass for a 589 nm fiber laser" Journal of Luminescence, 2000, V 91, N3—4(Nov), p. 133–138.*

* cited by examiner

*Primary Examiner*—Paul Ip
*Assistant Examiner*—Delma R. Flores Ruiz
(74) *Attorney, Agent, or Firm*—Thomas C. Stover

(57) ABSTRACT

The invention provides an improved glass host for a $Pr^{3+}$-doped glass 589 nm laser. For this purpose, a fluoroaluminate glass, of certain composition ranges, has been determined per the invention. Results indicate good lasing intensity at 589 nm in such fluoroaluminate glass host, particularly at elevated temperatures. The glass can be in the form of fiber, glass rod, or wave-guide.

20 Claims, 7 Drawing Sheets

589 NM LASER

RELATED APPLICATIONS

This application claims the benefit of a provisional application, Ser. No. 60/229,997, filed Sep. 5, 2000.

STATEMENT OF GOVERNMENT INTEREST

The invention described herein may be manufactured and used by or for the Government for governmental purposes without the payment of any royalty thereon.

FIELD OF THE INVENTION

This invention relates to a 589 nm laser and more particularly to such laser in Pr-doped glass.

BACKGROUND OF THE INVENTION

Satellite communication systems employ lasers at 589 nm (sodium D line) to generate a "bright star" reference used for correcting atmospheric distortion. This wavelength is currently available only from large-scale laser systems such as dye, OPO or sum-frequency Nd-YAG. However, such lasers are unsuitable for small-scale or mobile communication systems. $Pr^{3+}$-doped fluorozirconate ZBLAN glass has been extensively investigated for both a 1.3 μm amplifier and as a laser at red, green and blue wavelengths. Lasing at visible wavelengths originates from the $^3P_1+^3P_0$ levels. Tunable lasing at 599–618 nm has been demonstrated in both direct-pumped and upconversion lasers, but did not extend to 589 nm. That is, $Pr^{3+}$-doped fluorozirconate ZBLAN glass is known to lase at 601–618 nm but lasing at 589 nm can not be achieved in this host. Thus, $Pr^{3+}$ emission is known to be strongly host-dependent.

In the prior art are U.S. Pat. No. 6,061,170 to Rice et al (2000) and U.S. Pat. No. 5,832,006 to Rice et al (1998), which patents however, are directed to frequency laser amplifier arrays with no mention of a glass host doped with PrF for lasing at 589 nm, to generate a bright star reference therein.

Accordingly, there is need and market to identify a suitable host for the desired lasing to overcome the above prior art shortcomings.

There has now been discovered a suitable host to achieve lasing at 589 nm.

SUMMARY OF THE INVENTION

Broadly the present invention provides a lasing host comprising a fluoroaluminate glass doped with $PrF_3$ or $Pr^{3+}$ ions for lasing at 589 nm.

The invention further provides a method for increasing the emissions of the above fluoroaluminate glass, comprising heating the glass sufficiently to thermally enhance 589 nm fluorescence from $Pr^{3+}$ ions in the glass.

Also provided is a method for thermally enhancing 589 nm fluorescence from $Pr^{3+}$ ions in the above glass, wherein the glass is heated in order to increase the thermal population of the ions at the $^3P_1$ energy level, which level is described below.

The present invention has been described, in part, in a Paper published in the Journal of Luminescence, entitled $Pr^{3+}$-doped fluoride glass for a 589 nm fibre laser, published October 2000 by Mira Naftaly et al, which Paper is incorporated herein by reference.

BRIEF DESCRIPTION OF THE DRAWINGS

The invention will become more apparent from the following detailed specification and drawings in which.

DETAILED DESCRIPTION OF THE INVENTION

Bulk glass samples of fluoroaluminate and ZBLAN glasses were prepared from high-purity starting materials (99.99%) by melting in platinum crucibles and casting in brass molds, followed by annealing. The ZBLAN glass composition was $52ZrF_4$: $20BaF_2$: $4LaF_3$: $4AlF_3$: $20NaF$, where the $PrF_3$ dopant substituted for $LaF_3$.

The fluoroaluminate glass composition was, e.g., a sample (designated ALF5994) of $30AlF_3$: $3.5MgF_2$: $16CaF_2$: $13SrF_2$: $11BaF_2$: $8.5YF_3$: $10ZrF_4$: $4LiPO_3$ & $4Al(PO_3)_3$, which produced a glass with good thermal stability and a relatively high glass transition temperature of 410° C. In this composition $PrF_3$ substituted for $YF_3$. Both types of glass were doped with 1 mole % of $PrF_3$.

Figure 1:
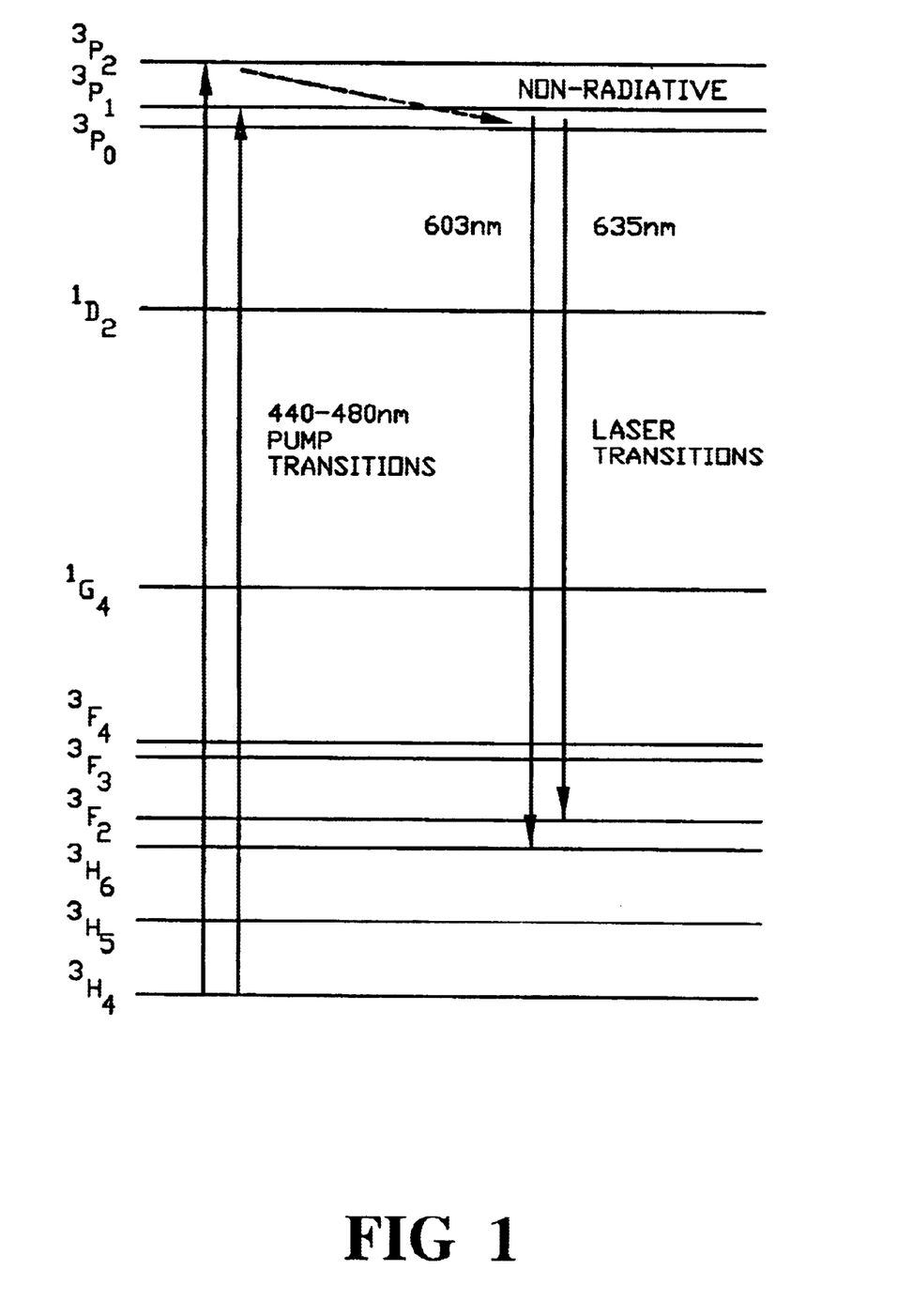
FIG. 1 is an energy level diagram of $Pr^{3+}$.

The energy level diagram of $Pr^{3+}$ is illustrated in FIG. 1. Ions can be excited to the lasing level by pumping either directly into $^3P_1+^3P_0$ or to an upper level $^3P_2$. The two dominant radiative transitions are $^3P_1+^3P_0 \rightarrow ^3F_2$ and $^3P_1+^3P_0 \rightarrow ^3H_6$, although other transitions are also present with smaller branching ratios.

When excited with blue and violet lines of an $Ar^+$ laser, $Pr^{3+}$ ions emit a red fluorescence of two peaks (FIGS. 3 and 4), $^3P_0 \rightarrow ^3H_6$ at 603 nm and $^3P_0 \rightarrow ^3F_2$ at 635 nm, which both originate from the $3P_0$ level. The short-wavelength shoulder of the emission peak at 603 nm contains a small contribution from the $^3P_1 \rightarrow ^3F_2$ transition. As seen in FIG. 1, the $^3P_0$ and $^3P_1$ levels lie sufficiently close together (~500 cm$^{-1}$) to be thermalized and at room temperature the population of the $^3P_1$ level is around 6%. It is evident from the emission spectra (FIGS. 4 and 3) that the $^3P_1 \rightarrow ^3F_2$ fluorescence peak lies at approximately 585 nm; a similar value is derived from the absorption spectrum shown in FIG. 2. Therefore the $^3P_1 \rightarrow ^3F_2$ fluorescence can provide a major contribution to the 589 laser. By heating the glass, the $^3P_1$ level can be populated and its emission greatly increased.

Figure 2:
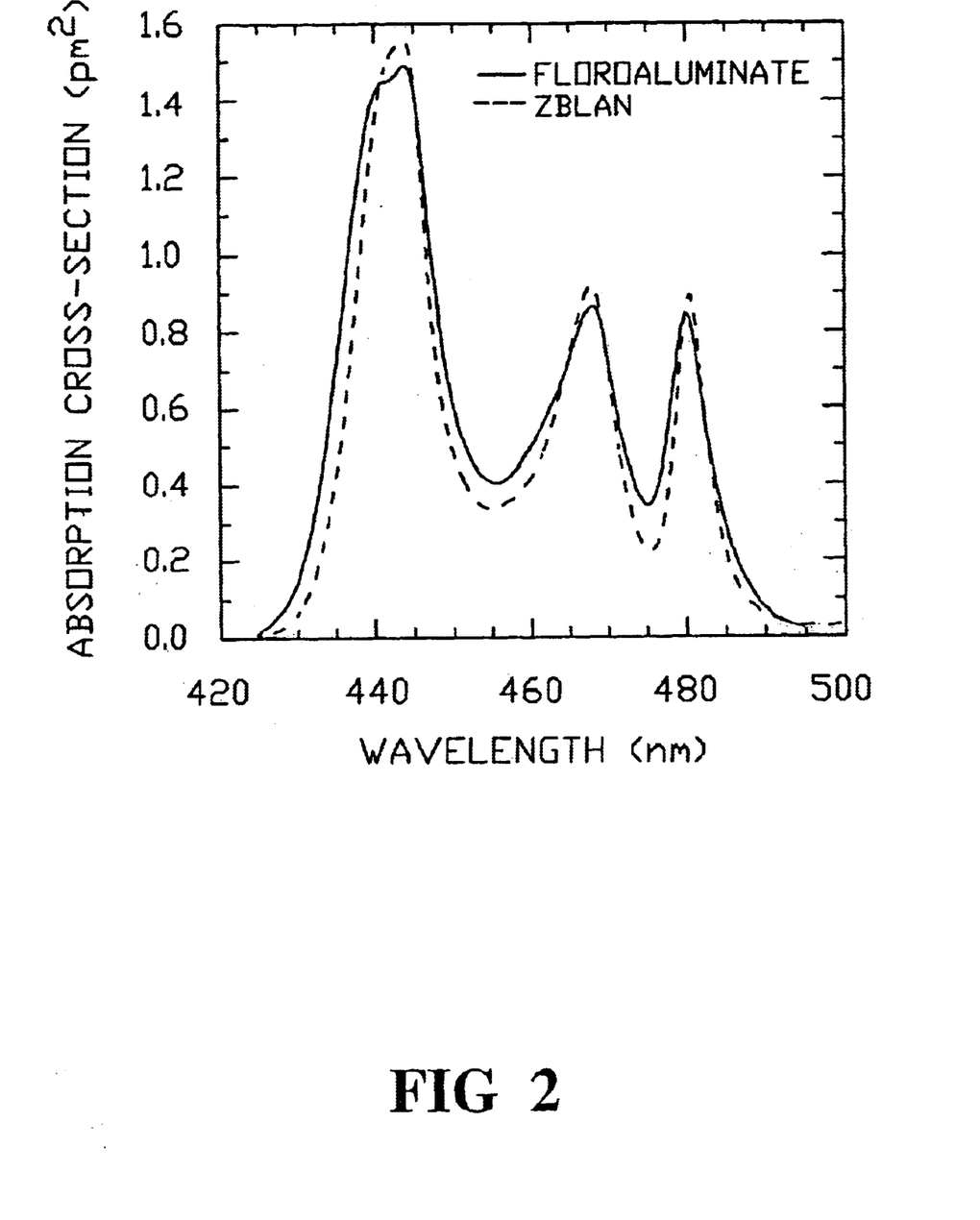
FIG. 2 is a graph showing pump absorption cross-sections of $Pr^{3+}$ in fluoroaluminate and ZBLAN glasses.

FIG. 2 shows the absorption cross-sections for pump radiation in fluoroaluminate glass and in ZBLAN. It is seen that the pump wavelength can be anywhere between ~440 nm and ~480 nm, and therefore is available from a number of convenient sources such as He-Cd laser and blue diode laser. The absorption cross-section is somewhat (~5%) larger in ZBLAN than in fluoroaluminate glass, due to its higher refractive index (1.50 in ZBLAN, 1.45 in fluoroaluminate). The absorption spectrum in fluoroaluminate glass is noticeably broader than in ZBLAN. This is in consequence of the large variety of dopant sites offered by fluoroaluminate glass, which arise from the presence of many different network modifiers. Referring to the glass compositions quoted above, ZBLAN has four network modifiers, whilst fluoroaluminate has 8, two of which are oxides ($Al(PO_3)_3$ and $LiPO_3$). The peak wavelengths in the two glasses differ slightly; this is highly relevant to the possibility of generating 589 nm lasing, as discussed below.

Figure 3:
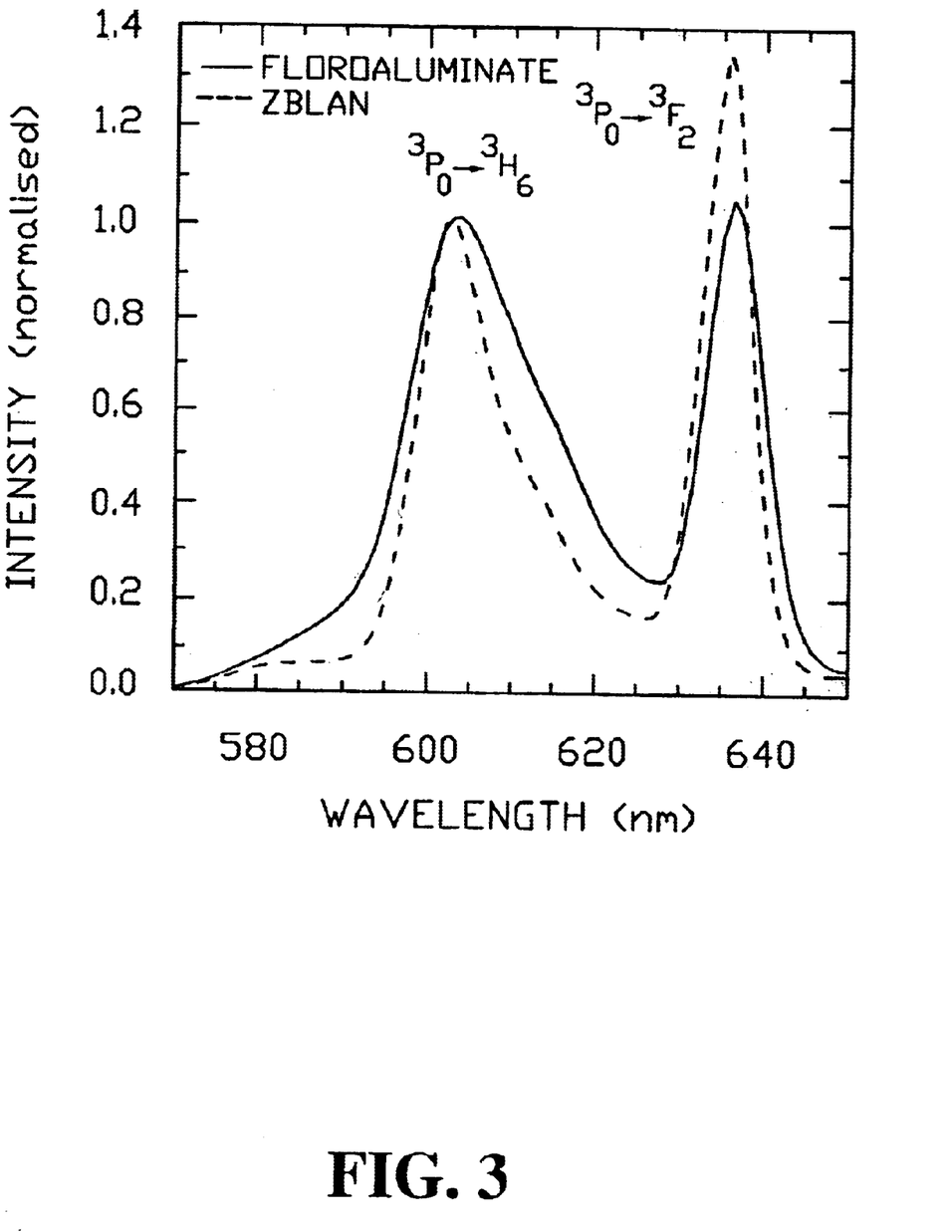
FIG. 3 is a graph showing red fluorescence spectra of $Pr^{3+}$ from $^3P_1+^3P_0$ levels in fluoroaluminate and ZBLAN glasses.

The red fluoroscence spectra of $Pr^{3+}$ from the $^3P_1+^3P_0$ levels are shown in FIG. 3 and consist of two peaks: $^3P_0 \rightarrow ^3H_6$ centered at 604 nm, and $^3P_0 \rightarrow ^3F_2$ centered at 637 nm. The two emission spectra, in fluoroaluminate and ZBLAN glasses differ significantly, much more so-than the absorption spectra in FIG. 2. First, the relative intensity of the $^3P_0 \rightarrow ^3F_2$ peak is 30% larger in ZBLAN than in fluoroaluminate glass. The $^3P_0 \rightarrow ^3F_2$ transition is hypersensitive, and varies strongly with the dopant site configuration, which is clearly different in $ZrF_4$- and $AlF_3$-based glasses. The higher $^3P_0 \rightarrow ^3F_2$ intensity in ZBLAN indicates a lower symmetry of dopant sites. Second, the peaks in ZBLAN are blue-shifted by about ~0.5 nm relative to those in fluoroaluminate glass. This nephelauxetic shift arises because of the higher ionicity of ZBLAN. The phosphate component of fluoroaluminate glass acts particularly strongly to lower its ionicity. Third, the emission spectrum is broader in fluoroaluminate glass, especially the $^3P_1+^3P_0 \rightarrow ^3H_6$ peak. In part, this is due to multiple dopant sites in this glass, as discussed above in relation to the absorption spectrum. A more important factor, however, is the contribution of emission from the $^3P_1$ level, as explained below.

For the purposes of obtaining lasing at 589 nm, attention is directed to the $^3P_0 \rightarrow ^3H_6$ peak. $^3P_1$ is used to mean the $F(^3P_1+^1I_6)$ energy level, since the energy of the two levels is quasiperfectly matched. The energy difference between the $^3P_1$ and $^3P_0$ levels (~550 cm$^{-1}$, see FIG. 2) approximates the phonon energy of the glass host (~580 cm$^{-1}$ in fluorozirconate, 600 cm$^{-1}$ in fluoroaluminate), causing these two levels to be thermalized. At room temperature, the population in the $^3P_1$ level is $\leq 10\%$; consequently emission from the $^3P_0$ level dominates the spectrum, with emission from $^3P_1$ level being observed primarily as a shoulder on the short-wavelength side of the $^3P_0$ peak (see FIG. 3).

The $^3P_1+^3P_0$ energy gap can be calculated from the data in FIG. 2 (see also Table 1), and shows that emission from $^3P_1$ is expected to occur approximately at ~585 and ~615 nm. This agrees with the observed position of the $^3P_1 \rightarrow ^3H_6$ shoulder in FIG. 3. The $^3P_1 \rightarrow ^3H_6$ transition is therefore suitable for generating lasing at 589 nm. In addition, the $^3P_1 \rightarrow ^3F_2$ peak at 615 nm contributes to the apparent width of the $^3P_0 \rightarrow ^3H_6$ peak, causing it to broaden (see also FIG. 4).

In ZBLAN the $^3P_1 \rightarrow ^3H_6$ shoulder is significantly lower than in fluoroaluminate glass, and the $^3P_0 \rightarrow ^3H_6$ peak is also narrower on its long wavelength side (FIG. 3), indicating a much smaller contribution of emission from the $^3P_1$ level. This may be explained by a larger $^3P_1 - ^3P_0$ energy gap which would reduce thermal population of the $^3P_1$ level. This conclusion is supported by the observed absorption spectra (FIG. 2 and Table 1), and by the more extensive evidence described below.

Table 1 below shows the $^3P_1 - ^3P_0$ energy gap ($\Delta E$), $^3P_1+^3P_0$ fluorescence lifetimes, and maximum achieved 589 nm/604 nm intensity ratios of $Pr^{3+}$ in fluoroaluminate and ZBLAN glasses.

TABLE 1

Figure 5:
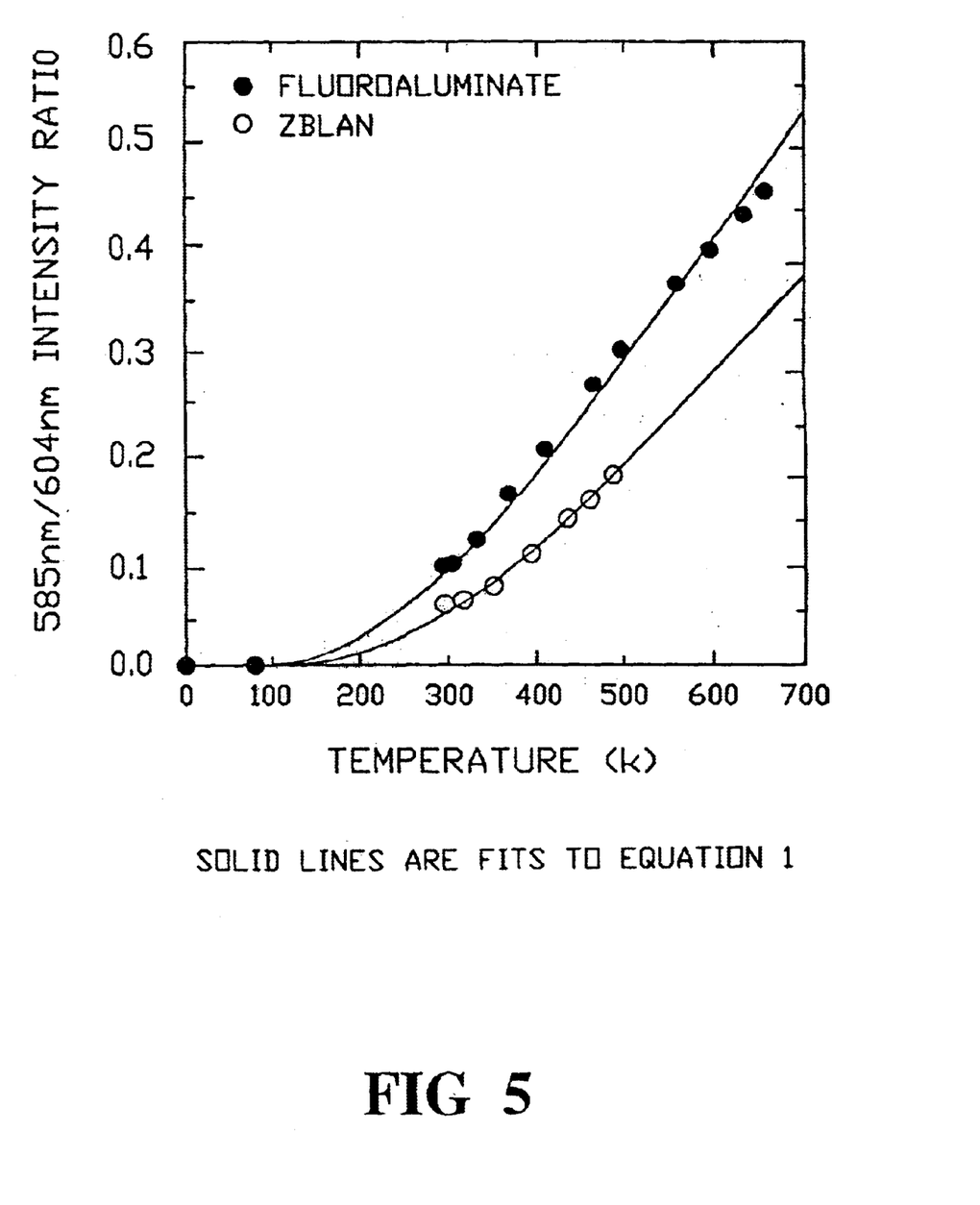
FIG. 5 is a graph showing temperature dependence of the $Pr^{3+}$ fluorescence intensity ratio at 585 nm/604 nm in fluoroaluminate and ZBLAN glasses.

| | Fluoroaluminate | ZBLAN |
|---|---|---|
| $\Delta E$, calculated from FIG. 5 (cm$^{-1}$) | 515 ± 20 | 630 ± 40 |
| $\Delta E$, measured from absorption spectrum (cm$^{-1}$) | 530 ± 10 | 580 ± 10 |
| Lifetime ($\mu s$) | 48 ± 5 | 55 ± 5 |
| Maximum achieved 589 nm/604 nm intensity ratio | 0.58 | 0.26 |

Figure 4:
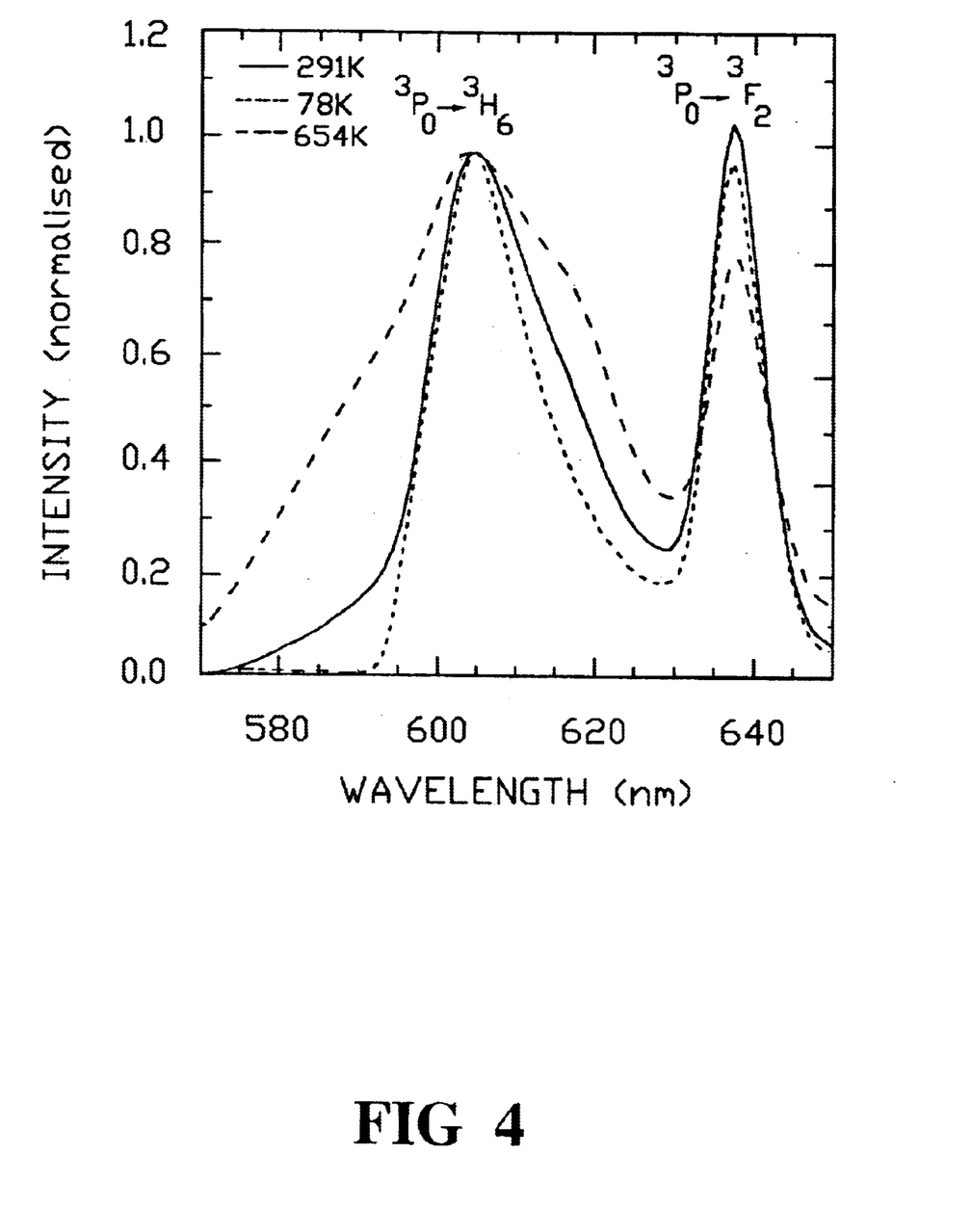
FIG. 4 is a graph showing red fluorescence spectra of $Pr^{3+}$ from $^3P_1+^3P_0$ levels in fluoroaluminate glass at different temperatures.

FIG. 4 shows red fluorescence spectra of $Pr^{3+}$ in fluoroaluminate glass at room temperature (291 K), at liquid-nitrogen temperature (78 K), and at elevated temperature (654 K). At 78 K the $^3P_1 \rightarrow ^3H_6$ shoulder disappears and the $^3P_0 \rightarrow ^3H_6$ peak narrows significantly on the long-wavelength side, confirming that these components of emission originate from the thermally populated $^3P_1$ level. The relative intensity of the $^3P_0 \rightarrow ^3F_2$ peak reduces slightly at 78 K, possibly also due to the disappearance of the tail of the $^3P_1 \rightarrow ^3F_2$ contribution.

At the elevated temperature of 654 K the $^3P_{1+}^3P_0 \rightarrow ^3H_6$ peak broadens dramatically as a result of greatly increased contributions at 585 and 615 nm from the $^3P_1$ level. The relative intensity of the $^3P_0 \rightarrow ^3F_2$ peak is sharply reduced, because less population is present in the $^3P_0$ level. These observations can be supported by calculating the ratio of areas of the two peaks at 604 and 637 nm at different temperatures, $A_{604\ nm}/A_{637\ nm}$: it is 6: 4 at 78 K, 6.5: 3.5 at 291 K, and 8: 2 at 654 K.

FIG. 4 shows that emission from $^3P_1$ contributes mainly to the area of the 604 nm peak. At 78 K almost the entire population resides in $^3P_0$; therefore at higher temperatures the population in $^3P_0$ is given approximately as $A_{637}(7)/A_{637}(78\ K)$, and is estimated to be 90% at 291 K and 50% 654 K. These calculations agree with the results described below. FIG. 4 demonstrates that the desirable emission at 589 nm can be enhanced by heating the glass in order to thermally populate the $^3P_1$ level.

According to the Maxwell-Boltzmann distribution, the ratio of populations in the $^3P_1$ and $3P_0$ levels at temperature T is given by $$\frac{N(^3P_1)}{N(^3P_0)} = \frac{e^{-\Delta E/kT}}{1 - e^{-\Delta E/kT}} \qquad (1)$$

where N is the number of ions in the energy level i.e., the population of ions at that level, e is the exponential function (~2.718), $\Delta E$ is the energy difference between the two levels and k is the Boltzmann constant. As seen in FIG. 4, fluorescence at 585 nm can be assumed to be due entirely to the $^3P_1$ level, the contribution from the $^3P_0$ level being negligible. Conversely, fluorescence at the peak maximum at 604 nm is due predominantly to the $^3P_0$ level (although there may be a small contribution from the tail of the 615 nm peak). Therefore the ratio of intensities at 585 and 604 nm corresponds to the population ratio of the two levels.

FIG. 5 plots the 585 nm/604 nm fluorescence intensity ratio as a function of glass temperature in fluoroaluminate and ZBLAN glasses. Solid lines show least-squares fits to Eq. (1); it is seen that the data fits well to the expected behavior. The calculated energy gaps are listed in Table 1, and are seen to be in agreement with those obtained from the absorption data.

FIG. 5 the curve for ZBLAN glass terminates at a lower temperature, because the softening point of ZBLAN is at 260° C., compared to 410° C. in fluoroaluminate. Whilst fluoroaluminate glass showed no evidence of being damaged or changed by repeated heating/cooling cycles over a period of 8 h, the measurements on ZBLAN glass had to be discontinued due to glass deformation and evidence of crystallization, especially on the glass surface.

The marked difference in the temperature dependence of the curves for fluoroaluminate and ZBLAN glasses, as seen in FIG. 5, arises from the different energy gaps ($\Delta E$) between the $^3P_1$ and $^3P_0$ levels (see Table 1). In fluoroaluminate glass the two levels lie closer together than in ZBLAN, thereby increasing the population in the $^3P_1$ level. This result is in agreement with the observed room-temperature emission spectra in the two glasses, shown in FIG. 3.

As seen in FIG. 4, fluorescence intensity in fluoroaluminate glass is considerably higher at 589 nm than at 585 nm, and increases rapidly at elevated temperatures. The 589 nm/604 nm intensity ratio at 654 K is 58%. Lasing in ZBLAN, has been reported as starting from 599 nm, where the emission level is 53% of the peak value and the slope of the emission profile is very steep (see FIG. 3). This indicates that under similar conditions, lasing at 589 nm is obtainable in fluoroaluminate glass at elevated temperatures, as discussed relative to Table 2 below.

The absorption cross-section for pump radiation is, however, severely reduced at elevated temperatures, as shown in FIG. 2. This is possibly due to the thermal population of the upper Stark sub-levels of the $^3H_4$ ground state. The reduction is particularly large at the peaks, and is much smaller in the "valleys", resulting in a flatter absorption spectrum. To compensate for the reduced pump absorption, the concentration of the $Pr^{3+}$ dopant and/or the length of the active medium (fiber) can be adjusted.

Table 1 also lists fluorescence lifetimes in fluoroaluminate and ZBLAN. These are similar in the two glasses, and are ~50 $\mu$s. The fluorescence decay was single exponential over 4 decades. The lifetimes do not change significantly when the glass is heated. This indicates that the nonradiative decay contribution to the lifetime is negligible and consequently, the quantum efficiency is very high.

From the above it can be seen that $Pr^{3+}$ emission at 589 nm can be dramatically increased by heating the glass host. The observed thermal dependence conforms to that expected from the Maxwell-Boltzmann distribution. In fluoroaluminate glass, emission intensity at 589 nm reached over 50% of the main peak. In ZBLAN glass this is not possible due to its larger energy gap and lower glass transition temperature. Lasing at 589 nm is thus achievable in a $Pr^{3+}$-doped fluoroaluminate glass.

The fluoroaluminate glass of the invention can contain the following components:

$AlF_3$ in the range of 25–35 mole %, preferably in the range 28–32 mole %;

$MgF_2$ in the range of 2–5 mole %, preferably in the range 34 mole %;

$CaF_2$ in the range of 12–22 mole %, preferably in the range 14–20 mole %;

$SrF_2$ in the range of 9–16 mole %, preferably in the range 12–14 mole %;

$BaF_2$ in the range of 8–14 mole %, preferably in the range 10–12 mole %;

$YF_3$ in the range of 6–11 mole %, preferably in the range 7–10 mole %;

$ZrF_4$ in the range of 6–14 mole %, preferably in the range 8–12 mole %;

$LiPO_3$ in the range of 2–10 mole %, preferably in the range 3–6 mole %;

$Al(PO_3)_3$ in the range of 2–10 mole %, preferably in the range 3–6 mole %;

where preferably the amounts of $LiPO_3$ and $Al(PO_3)_3$ are equal and their sum does not exceed 12 mole %.

Preferably such glass does not contain NaF or other Na compounds except it can contain $NaPO_3$ in the range of 0.1–5.0 mole % for extra glass stability.

The above fluoroaluminate glass is suitably doped with $PrF_3$ in the amount of 0.1–10 mole %, where $PrF_3$ can substitute for $YF_3$ or $AlF_3$ in the composition, preferably for $YF_3$.

The invention also provides a method of thermally enhancing the 589 nm fluorescence from $Pr^{3+}$ ions in the fluoroaluminate glass, wherein such glass is heated in order to increase the thermal population at the $^3P_1$ energy level of the so excited $Pr^{3+}$ ions. That is, the 589 nm fluorescence originates primarily from the $^3P_1$ excited level with a smaller contribution from the $^3P_0$ level. The populations of the two levels are determined by the Maxwell-Boltzmann distribution discussed above.

The fluoroaluminate glass host of the invention, can take various forms such as glass fiber, glass rod or wave-guide. However the glass fiber form is preferred. Thus the fluoroaluminate glass of the invention has the following properties, responsive to lasing at 589 nm. That is, the glass has high thermal stability, which allows it to be heated above 350° C. without deterioration and also such glass can be readily fabricated into optical fibers or other geometric forms.

Further, the inventive glass is not susceptible to attack by atmospheric moisture yet has high solubility for $Pr^{3+}$ ions. Also, the $^3P_1$–$^3P_0$ energy gap of $Pr^{3+}$ ions, incorporated in the inventive glass, is reduced (due to ion-host interaction), causing a higher population of excited ions to reside in the $^3P_1$ state at a given temperature, thus requiring lower temperature to obtain the requisite 589 nm emission. Further, the inventive glass has multiple dopant sites for $Pr^{3+}$ ions causing a broadening of emission lines, thus increasing the contribution of the 3 level to 589 nm emission.

Thus the fluoroaluminate glass of the invention is doped with $Pr^{3+}$ ions so as to provide as a lasing host, a 589 nm lasing glass fiber, glass rod or wave-guide.

(The Following is From the Final Report:)

As demonstrated above, the emission spectrum of $Pr^{3+}$ depends strongly on the host glass. In particular, the population of the $^3P_1$ level, at a given temperature, is determined by the $^3P_1$–$^3P_0$ energy gap, $\Delta E$. Thus it has been found that $\Delta E$ varies significantly in different glass hosts (see FIG. 5 and Table 1 herein). Since it is advantageous to lase the host at relatively low temperatures, the glass host of the invention has been designed so as to minimize $\Delta E$ for the $Pr^{3+}$-doped 589 nm laser.

Also phosphates in the form of metaphosphates have a slight beneficial effect on reducing $\Delta E$, while greatly improving the glass stability and resistance to devitrification. Further, fluoroaluminate compositions, containing $YF_3$ and $ZrF_4$, perform better both spectroscopically and as more stable glasses.

It has also been found that the $\Delta E$ is reduced when Na compounds are removed from the glass except that, in a trade-off, $NaPO_3$ can add durability to the glass.

Thus two fluoroaluminate glasses of the invention, ALF5994 (described above) and ALF599 were prepared and compared with the above ZIBLAN glass.

The '5994 glass had the composition noted above, that is, in mole %;

$30AlF_3$: $3.5MgF_2$: $16CaF_2$: $13SrF_2$: $11BaF_2$: $8.5YF_3$: $10ZrF_4$: $4LiPO_3$ & $4Al(PO_3)_3$.

The '599 glass was similar except that the 4LiPO$_3$ was replaced with 4 NaPO$_3$ in the above composition.

Figure 6:
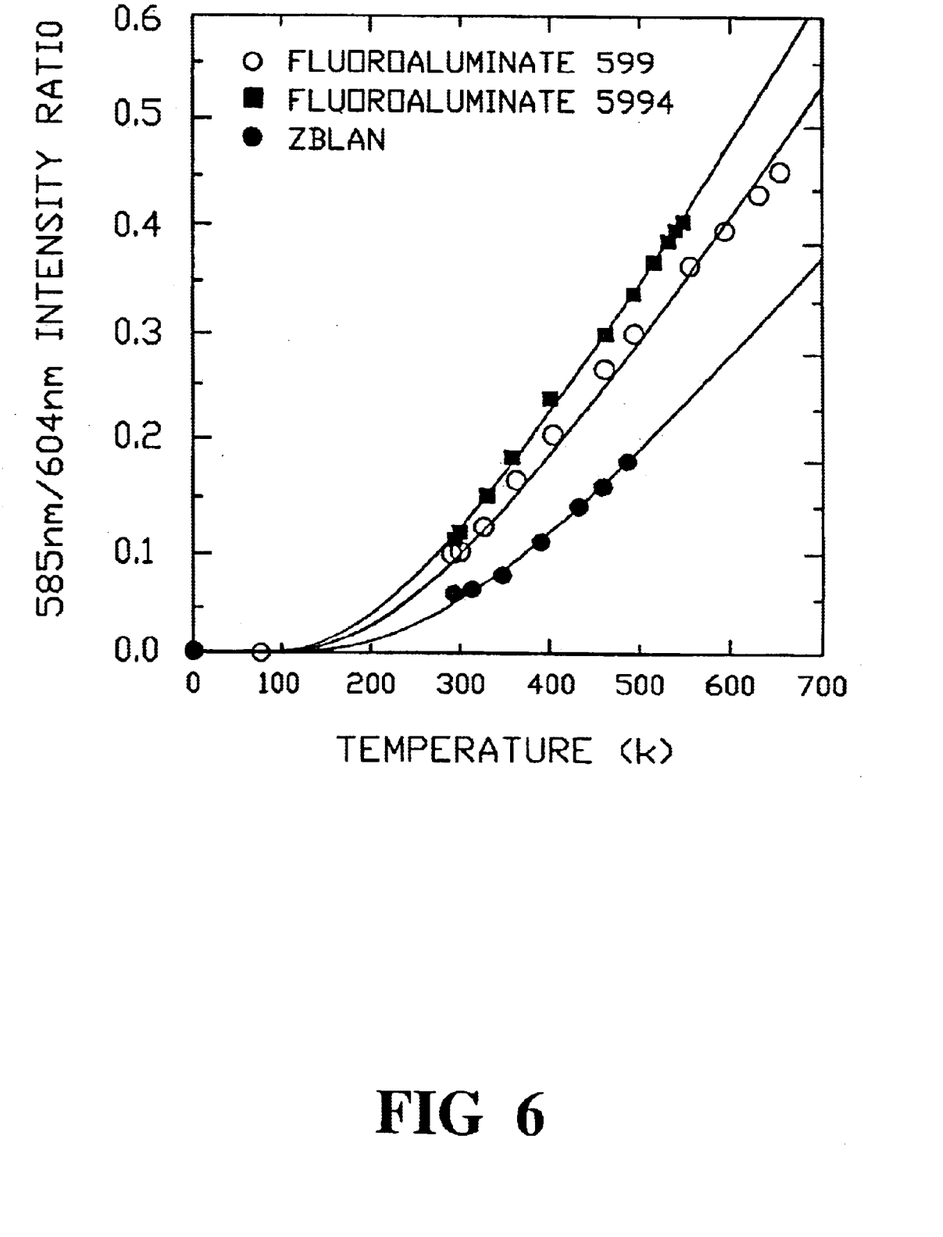
FIG. 6 is a graph showing the 585 nm/604 nm intensity ratio as a function of temperature in three laser host glasses and FIG. 7 is a graph showing a 589 nm/604 nm intensity ratio as a function of temperature in two inventive laser host glasses.

FIG. 6 compares the performance of the three glasses. That is, FIG. 6 shows the 585 nm/604 nm intensity ratio as a function of temperature in the three glasses: ALF5994, ALF599 and ZBLAN. The reason for plotting the 585 nm/604 nm ratio and the calculation of the fitted curves are described above. It is seen that in ALF5994 this ratio rises more steeply. The calculated $^3P_1$–$^3P_0$ energy gap ΔE is 470 cm$^{-1}$ in ALF5994 and 515 cm$^{-1}$ in ALF599.

Figure 7:
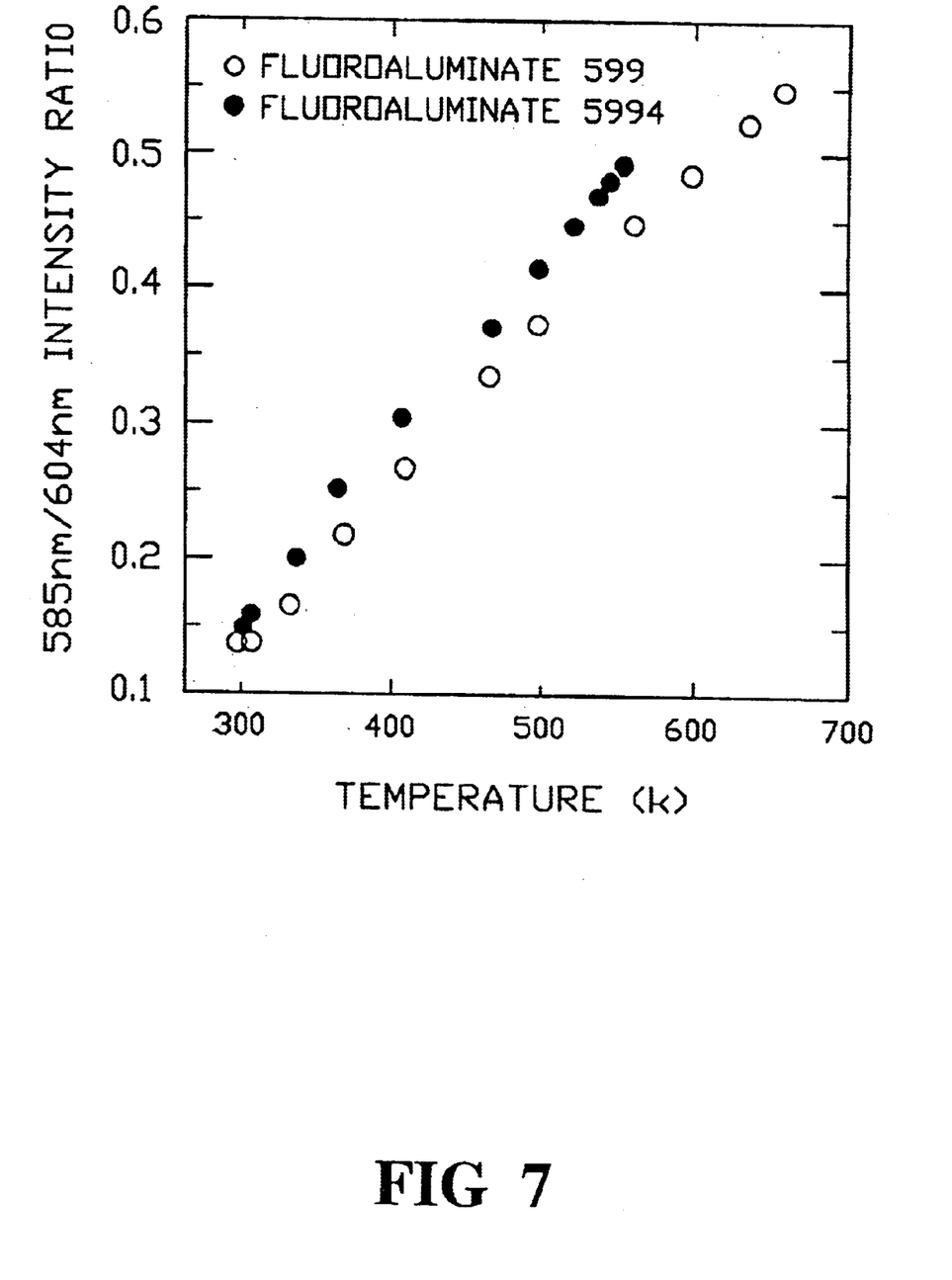

FIG. 7 shows the 589 nm/604 nm intensity ratio as a function of temperature in ALF5994 and ALF599. Again it is seen that at a given temperature ALF5994 exhibits a larger relative intensity at 589 nm. Emission intensity of 50% (3 dB) at 589 nm is achieved at 270° C. in ALF5994 compared with 320° C. in ALF599. These results are summarized in Table 2 below.

TABLE 2

| Glass | ALF5994 | ALF599 |
|---|---|---|
| ΔE (cm$^{-1}$) | 470 ± 10 | 515 ± 10 |
| Temperature where 589 nm/604 nm is at 50% | 270° C. | 320° C. |

Thus the '5994 sample performed better spectroscopically and with improved glass stability, as noted above, while the '599 sample enjoyed greater glass stability but at lesser performance per Table 2, while both inventive glasses out-performed ZIBLAN, per FIG. 6.

It has been found that the glass softening point T$_g$ is at 410° C., which confirms the stability of the inventive fluoroaluminate glass embodiments for lasing at the above temperatures.

Thus the fluoroaluminate glass of the invention is believed a suitable host for a Pr$^{3+}$-doped laser at 589 nm. Emission at 589 nm is obtained by heating the glass to thermally populate the $^3P_1$ level. It is believed that the '5994 laser can operate at temperatures in a range of 250–280–300° C. This is at least 110° C. below the softening point of the glass. Also the '599 laser can operate at about 50° C. higher than such range. Also, it is desirable to lase at the lowest temperature which produces effective lasing.

It has been found that the glass is not damaged by being maintained for a long period at these temperatures. DSC results confirm that the glass is highly stable, and that it is not likely to de-vitrify or deform under these conditions. Thus the fluoroaluminate glass embodiments of the invention are believed highly suitable hosts for the Pr$^{3+}$-doped glass 589 nm laser.

What is claimed is:

1. A system for generating lasing at about 589 nm comprising, a laser pump for emitting a laser beam at about 440–480 nm, a lasing host which includes a fluoroaluminate glass doped with sufficient Pr$^{3+}$ ions to lase at about said 589 nm, means to pump said beam into said host to excite said ions, and means to mount said glass host proximate said pump.

2. The host of claim 1 wherein said glass contains one or more compounds selected from the group of:
   AlF$_3$ in the range of 25–35 mole %,
   MgF$_2$ in the range of 2–5 mole %,
   CaF$_2$ in the range of 12–22 mole %,
   SrF$_2$ in the range of 9–16 mole %,
   BaF$_2$ in the range of 8–14 mole %,
   YF$_3$ in the, range of 6–11 mole %,
   ZrF$_4$ in the range of 6–14 mole %,
   LiPO$_3$ in the range of 2–10 mole % and
   Al(PO$_3$)$_3$ in the range of 2–10 mole %.

3. The host of claim 2 containing one or more compounds selected from the group of:
   AlF$_3$ in the range of 28–32 mole %;
   MgF$_2$ in the range 3–4 mole %;
   CaF$_2$ in the range 14–20 mole %;
   SrF$_2$ in the range 12–14 mole %;
   BaF$_2$ in the range 10–12 mole %;
   YF$_3$ in the range 7–10 mole %;
   ZrF$_4$ in the range 8–12 mole %;
   LiPO$_3$ in the range 3–6 mole % and
   Al(PO$_3$)$_3$ in the range of 3–6 mole %.

4. The host of claim 1 wherein said glass is doped with said PrF$_3$ in the range of 0.1–10 mole %.

5. The host of claim 1 wherein said glass is doped with Pr$^{3+}$ ions in the range of 0.1–10 mole %.

6. The host of claim 2 wherein said glass is doped with said PrF$_3$ in the range of 0.1–10 mole %.

7. The host of claim 1 wherein said glass contains little or no Na ions or compounds.

8. The host of claim 1 wherein said glass contains NaPO$_3$ in the range of 0.1–5.0 mole %.

9. The host of claim 1 wherein said glass contains NaPO$_3$ in the range of 0.1–5.0 mole % in place of a portion of or all of said LiPO$_3$.

10. The host of claim 1 wherein said glass is in the form of an optic fiber.

11. The host of claim 1 wherein said glass is in the form of a 589 nm lasing glass fiber, glass rod or wave-guide.

12. The host of claim 1 wherein the composition of said glass in mole % is 30AlF$_3$: 3.5MgF$_2$: 16CaF$_2$: 13SrF$_2$: 11BaF$_2$: 8.5YF$_3$: 10ZrF$_4$: 4LiPO$_3$ and 4Al(PO$_3$)$_3$.

13. The host of claim 12 wherein 0.1–5 mole % of NaPO$_3$ is added thereto.

14. The host of claim 13 wherein 4 mole % of NaPO$_3$ replaces said 4 mole % of LiPO$_3$.

15. The host of claim 1 mounted in a satellite communication system to lase at 589 nm to generate a bright star reference therein.

16. A method for obtaining lasing at 589 nm comprising, pumping a laser beam of about 440–480 nm into a fluoroaluminate glass host doped with sufficient Pr$^{3+}$ ions to excite said ions and generate the 589 nm lasing.

17. A method for increasing emissions of the fluoroaluminate glass of claim 16 comprising heating said glass sufficiently to thermally enhance the 589 nm fluorescence from Pr$^{3+}$ ions in said glass.

18. A method for thermally enhancing a 589 nm fluorescence from Pr$^{3+}$ ions in the glass of claim 17 comprising heating said glass to 250–300° C. or more.

19. The host of claim 1 wherein said glass is doped with PrF$_3$ in the amount 0.1–10 mole %.

20. The host of claim 17 wherein said glass is doped with PrF$_3$ in the amount 0.1–10 mole %.

* * * * *